US010925087B2

(12) United States Patent
Sun et al.

(10) Patent No.: US 10,925,087 B2
(45) Date of Patent: Feb. 16, 2021

(54) METHODS AND APPARATUSES FOR COMMUNICATIONS OF A FLEXIBLE TRANSPORT BLOCK

(71) Applicant: QUALCOMM Incorporated, San Diego, CA (US)

(72) Inventors: Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/353,154

(22) Filed: Mar. 14, 2019

(65) Prior Publication Data

US 2019/0297642 A1 Sep. 26, 2019

Related U.S. Application Data

(60) Provisional application No. 62/645,343, filed on Mar. 20, 2018.

(51) Int. Cl.
*H04W 72/14* (2009.01)
*H04L 1/18* (2006.01)
(Continued)

(52) U.S. Cl.
CPC ........... *H04W 72/14* (2013.01); *H04L 1/1812* (2013.01); *H04L 1/1887* (2013.01);
(Continued)

(58) Field of Classification Search
CPC .................. H04W 72/14; H04W 72/0446; H04L 1/1896; H04L 5/0053; H04L 1/1887;
(Continued)

(56) References Cited

U.S. PATENT DOCUMENTS

2016/0226643 A1   8/2016 Mallik et al.
2019/0045390 A1*  2/2019 Davydov .......... H04W 28/0289
(Continued)

OTHER PUBLICATIONS

Ericsson: "On TBS Determination and DL/UL Resource Allocation", 3GPP Draft; R1-1719596 On TBS Determination and DL_UL Resource Allocation, 3rd Generation Partnership Project (3GPP), Mobile Competence Centre, 650, Route Des Lucioles; F-06921 Sophia-Antipolis Cedex, France, vol. RAN WG1, No. Reno, US; Nov. 27, 2017-Dec. 1, 2017, Nov. 18, 2017 (Nov. 18, 2017), pp. 1-12, XP051369410, Retrieved from the Internet: URL: http://www.3gpp.org/ftp/tsg_ran/WG1_RL1/TSGR1_91/Docs [retrieved on Nov. 18, 2017], Section 2.2 and 3.

(Continued)

*Primary Examiner* — Omar J Ghowrwal
(74) *Attorney, Agent, or Firm* — QUALCOMM Incorporated

(57) ABSTRACT

A transmission opportunity (TO) allows a transmitting device, such as a base station to transmit up to a predetermined TO duration. For new radio (NR), subcarrier spacing (SCS) is no longer fixed. This may limit a TO duration for a UE to a small portion of the allowed TO duration, for new radio (NR), a transport block (TB) takes up one slot. A method, apparatus, and computer-readable medium are disclosed extend a TB over more than one slot to maximize utilization of a TO duration, for improved resource utilization and service quality. A method, apparatus, and computer-readable medium implemented by a communication device are disclosed to receive a signaling message, to configure a flexible transport block (TB) to extend the TB over more than one slot. Then the communication device may receive a portion of the flexible TB, based on the received signaling message.

29 Claims, 13 Drawing Sheets

(51) Int. Cl.
*H04L 5/00* (2006.01)
*H04W 72/04* (2009.01)
*H04L 1/16* (2006.01)

(52) U.S. Cl.
CPC .......... *H04L 1/1896* (2013.01); *H04L 5/0053* (2013.01); *H04L 5/0055* (2013.01); *H04L 5/0094* (2013.01); *H04W 72/0446* (2013.01); *H04L 1/1614* (2013.01); *H04L 1/1819* (2013.01)

(58) Field of Classification Search
CPC ... H04L 5/0094; H04L 1/1812; H04L 5/0055; H04L 1/1819; H04L 1/1614
See application file for complete search history.

(56) References Cited

U.S. PATENT DOCUMENTS

| | | | | |
|---|---|---|---|---|
| 2019/0149271 A1* | 5/2019 | Yin | ........................ | H04L 1/1816 370/329 |
| 2019/0150122 A1* | 5/2019 | Ying | ..................... | H04L 1/1861 370/329 |
| 2019/0191486 A1* | 6/2019 | Myung | ............... | H04W 72/042 |
| 2019/0327759 A1* | 10/2019 | Lee | ........................ | H04L 5/0053 |
| 2019/0363840 A1* | 11/2019 | Wang | .................... | H04L 1/1861 |
| 2019/0372720 A1* | 12/2019 | Lee | ........................ | H04L 1/1812 |
| 2020/0245350 A1* | 7/2020 | Lee | ................... | H04W 72/1284 |

OTHER PUBLICATIONS

Intel Corporation: "Resource Allocation and TBS", 3GPP Draft; R1-1717393 Intel TBS_RA, 3rd Generation Partnership Project (3GPP), Mobile Competence Centre, 650, Route Des Lucioles; F06921 Sophia-Antipolis Cedex, France, vol. RAN WG1, No. Prague, Czech Republic; Oct. 9, 2017-Oct. 13, 2017, Oct. 8, 2017 (Oct. 8, 2017), pp. 1-13, XP051340583, Retrieved from the Internet: URL: http://www.3gpp.org/ftp/Meetings_3GPP_SYNC/RAN1/Docs/ [retrieved on Oct. 8, 2017], Section 3.1.
International Search Report and Written Opinion—PCT/US2019/022948—ISA/EPO —dated Jun. 28, 2019.
Qualcomm Incorporated: "Remaining Issues on DL/UL Resource Allocation", 3GPP Draft; R1-1802841 DL-UL-Resourceallocation, 3rd Generation Partnership Project (3GPP), Mobile Competence Centre, 650, Route Des Lucioles; F-06921 Sophia-Antipolis Cedex, France, vol. RAN WG1, No. Athens, Greece; Feb. 26, 2018-Mar. 2, 2018, Feb. 17, 2018 (Feb. 17, 2018), pp. 1-11, XP051398254, Retrieved from the Internet: URL: http://www.3gpp.org/ftp/tsg_ran/WG1_RL1/TSGR1_92/Docs/ [retrieved on Feb. 17, 2018], Section 2.3.
Sequans: "CBG Based HARQ-Ack/Nack", 3GPP Draft; R1-1713299—CBG Based HARQ, 3rd Generation Partnership Project (3GPP), Mobile Competence Centre; 650, Route Des Lucioies; F-06921 Sophia-Antipolis Cedex; France, vol. RAN WG1, No. Prague, P.R. Czechia; Aug. 21, 2017-Aug. 25, 2017 Aug. 20, 2017, XP051316106, Retrieved from the Internet: URL: http://www.3gpp.org/ftp/Meetings_3GPP_SYNC/RAN1/Docs/ [retrieved on Aug. 20, 2017], 5 pages, Section 2.

* cited by examiner

1100

Transmitting a signaling message to a receiving communication device — 1102

Transmitting one or more CBGs of data — 1104

Determining an actual TB size — 1106

Receiving an ACK/NACK bitmap — 1108

Retransmitting NACKed CBGs — 1110

FIG. 11

METHODS AND APPARATUSES FOR COMMUNICATIONS OF A FLEXIBLE TRANSPORT BLOCK

CLAIM OF PRIORITY

This application claims the benefit of U.S. Provisional Application Ser. No. 62/645,343, entitled "METHODS AND APPARATUSES FOR UTILIZATION OF FULL LENGTH OF TRANSMISSION OPPORTUNITY" and filed on Mar. 20, 2018, which is expressly incorporated by reference herein in its entirety.

BACKGROUND

Field

The present disclosure relates generally to wireless communication systems, and more particularly, to a methods and apparatuses for utilization of full length of transmission opportunity for a new radio system.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

Wireless communication systems may also include or support networks used for vehicle based communications, also referred to as vehicle-to-everything (V2X), vehicle-to-vehicle (V2V) networks, and/or cellular V2X (C-V2X) networks. Vehicle based communication networks may provide always on telematics where UEs, e.g., vehicle UEs (v-UEs), communicate directly to the network (V2N), to pedestrian UEs (V2P), to infrastructure devices (V2I), and to other v-UEs (e.g., via the network). The vehicle based communication networks may support a safe, always-connected driving experience by providing intelligent connectivity where traffic signal/timing, real-time traffic and routing, safety alerts to pedestrians/bicyclist, collision avoidance information, etc., are exchanged.

Such network supporting vehicle based communications, however, may also be associated with various requirements, e.g., communication requirements, security and privacy requirements, etc. Other example requirements may include, but are not limited to, reduced latency requirements, higher reliability requirements, and the like. For example, vehicle-based communications may include communicating sensor data that may support self-driving cars. Sensor data may be used between vehicles to improve the safety of self-driving cars.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

The transmission opportunity (TO) allows a transmitting communication device, such as a transmitting base station or UE to transmit up to a pre-determined TO duration, waiting for an acknowledgement/negative-acknowledgement (ACK/NACK) response before the transmitting base station or UE is allowed to transmit again. During the TO duration, the resource may be allocated to another node, such as another UE. The TO may vary based on different jurisdictions and other factors. For NR, subcarrier spacing (SCS) is no longer fixed and may vary based in part on the spectrum in use. Also, for NR, for example, there is a maximum of 16 HARQ processes, meaning that a UE may transmit a burst of data up to 16 slots, before HARQ process resources are exhausted. This may limit a user-specific TO length to 16 slots, or 2 milliseconds (ms), at 120 KHz SCS. This is still considerably short of maximum allowed TO length, thus not fully utilizing the allowed TO length. For example, for unlicensed frequency bands, a TO length can be up to 10 ms.

The data from the upper layer (or MAC) given to the physical layer in a wireless system, such as LTE system, is basically referred as transport block (TB). For NR, a slot-based resource scheduling is adopted. A transport block takes up one slot. Thus, there is a need for a method, apparatus, and computer-readable medium to extend a TB over more than one slot to maximize utilization of a TO, for more efficient resource utilization and improved service quality.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 11 is a flowchart of a method of wireless communication in accordance with one or more aspects of the present disclosure.

DETAILED DESCRIPTION

Figure 1:
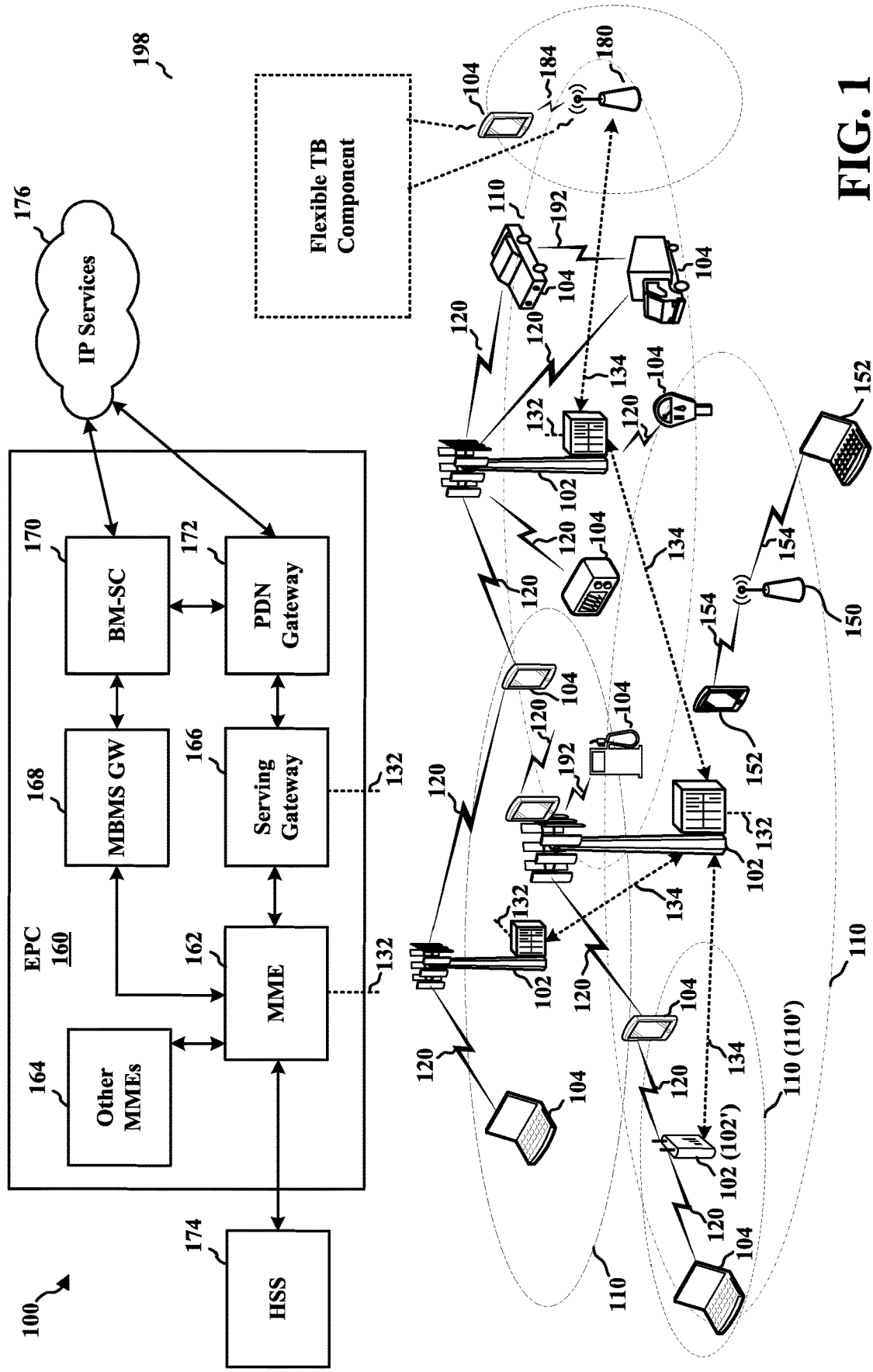
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

By way of example, in some systems, the data from the upper layer (or MAC) given to the physical layer in LTE system is referred as transport block (TB). The transport block size is decided based on the number of Physical Resource Blocks (NPRB) and the MCS (Modulation and Coding Scheme). CRC (cyclic redundancy check) is appended to each transport block which provides error detection. Entire transport block is divided by Cyclic Generator Polynomial as specified in TS 36.212 (section-5.1.1). This generates 24 parity bits. These 24 bits of parity is appended at the end of transport block.

A transport block (TB) may segmented into code blocks before being passed to the channel coding and rate matching modules. For NR, the code blocks (CBs) are grouped into code block groups (CBGs). After the code blocks are outputted by a rate matching module, they may be concatenated to form CBGs. The CBGs may be concatenated or combined to recover the entire TB.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to YMHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, BLUETOOTH, ZIGBEE, WI-FI based on the IEEE 802.11 standard, LTE, or NR.

The wireless communications system may further include a WI-FI access point (AP) 150 in communication with WI-FI stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the WI-FI AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104s may be configured to include a flexible TB component (198) that enables base station 180 and the UEs 104 to extend a TB over more than one slot for improved utilization of a transmission opportunity. This in turn enables the UE and the base station to utilize the resource more efficiently for a better service quality.

Figure 2:
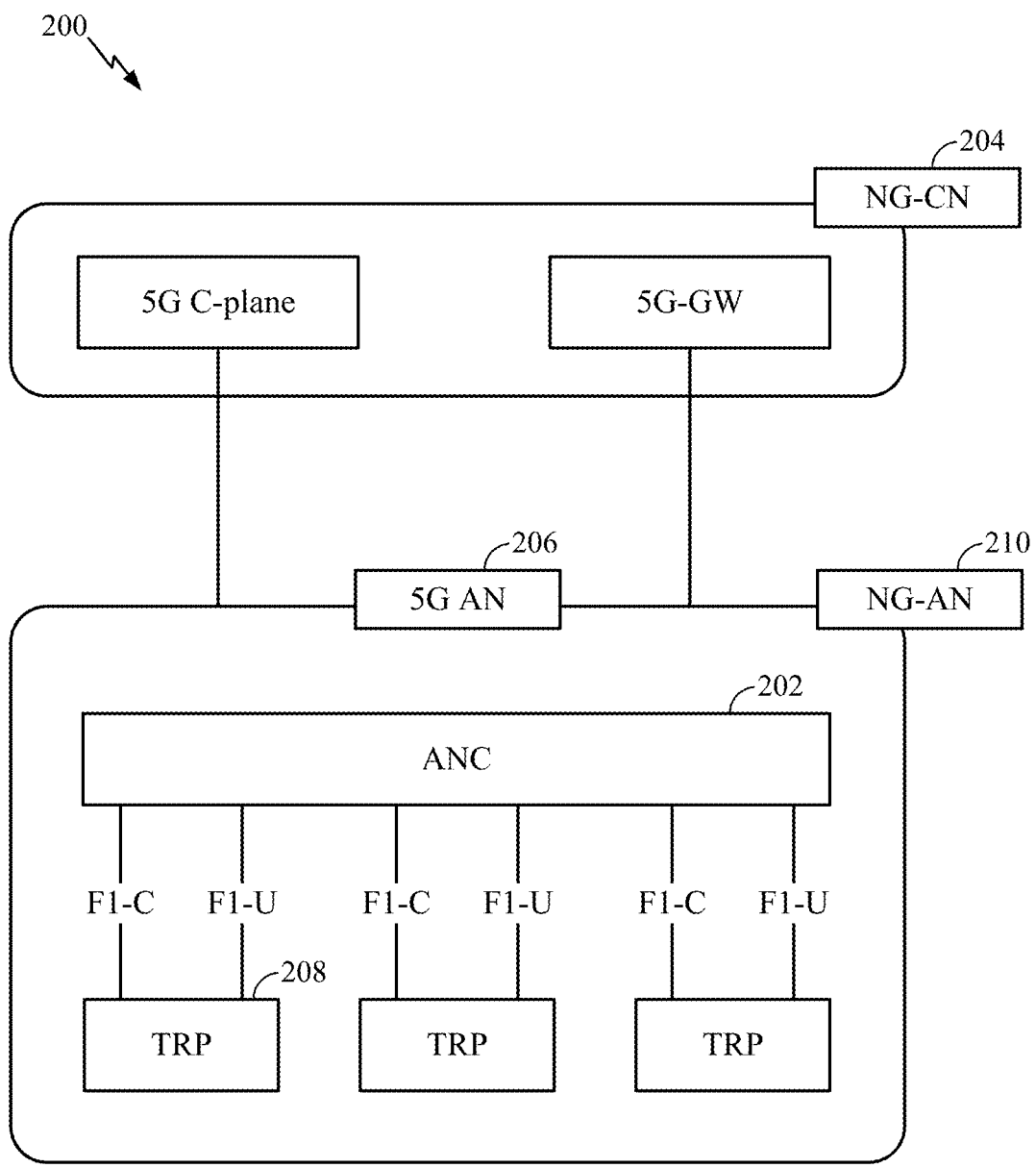
FIG. 2 illustrates an example logical architecture of a distributed radio access network.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be present within a TRP and/or across TRPs via the ANC 202. According to aspects, no inter-TRP interface may be needed/present.

According to aspects, a dynamic configuration of split logical functions may be present within the architecture 200. In one example aspect, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
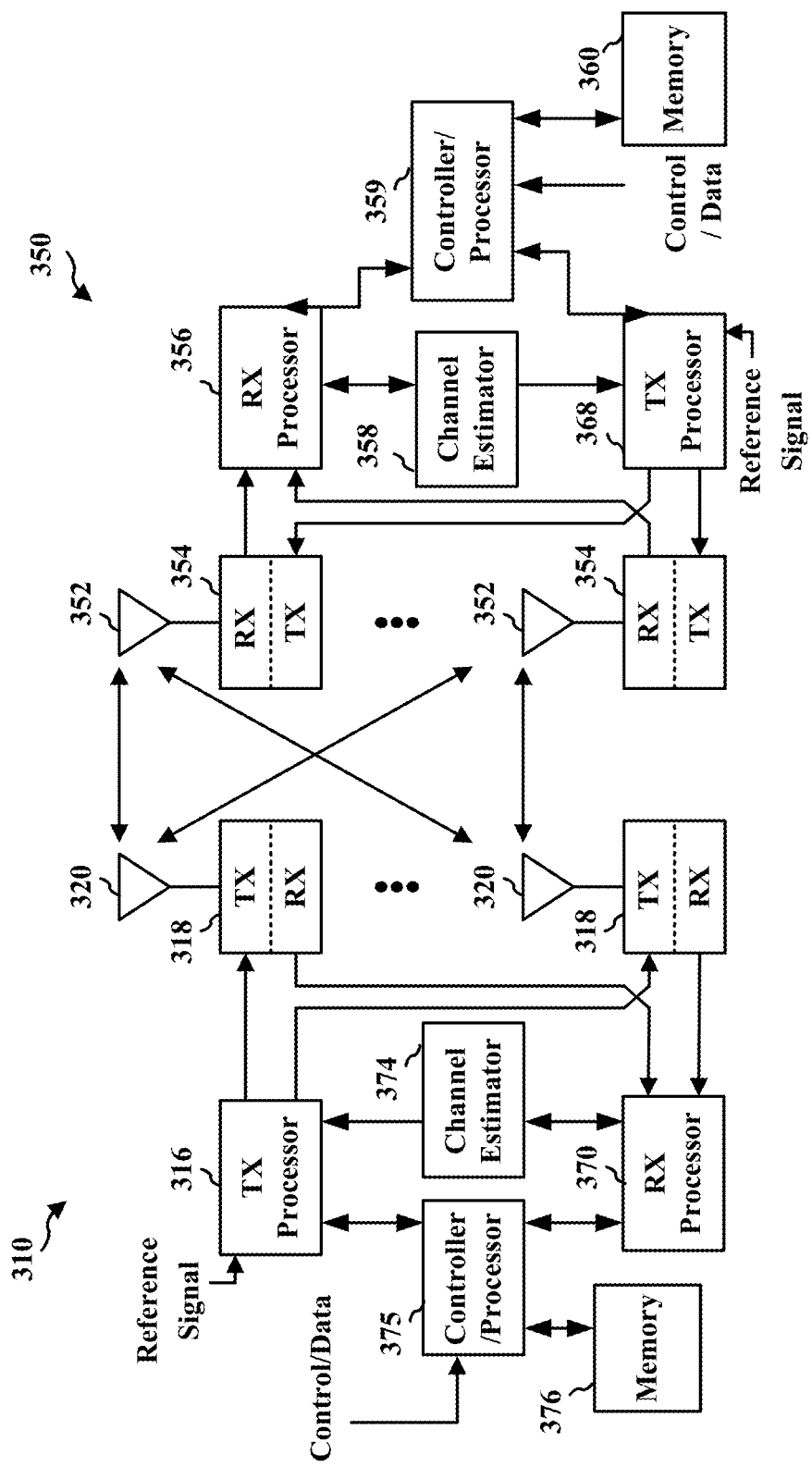
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
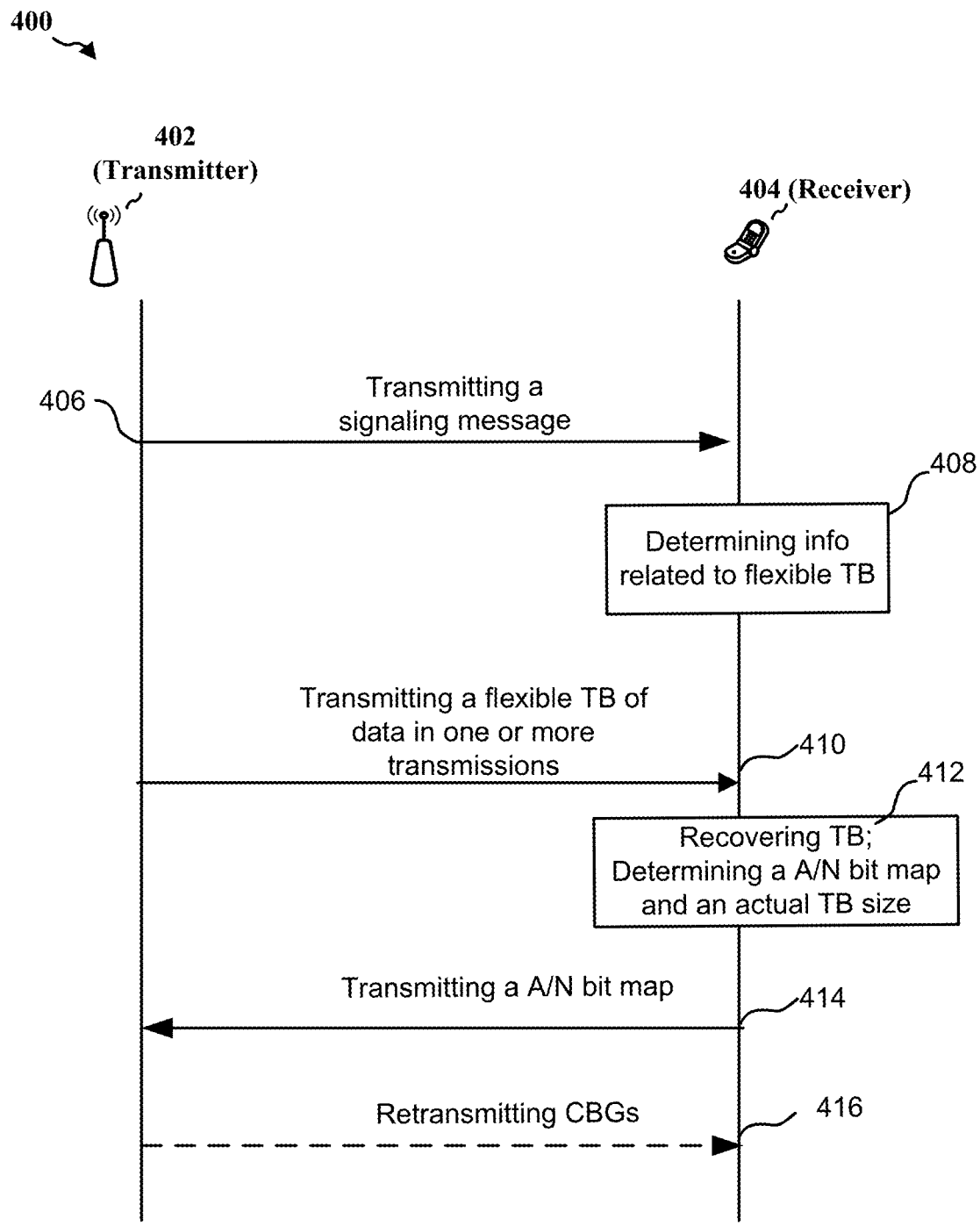
FIG. 4 is a diagram of a wireless communications system that supports flexible transport blocks in accordance with one or more aspects of the present disclosure.

FIG. 4 illustrate an example of a wireless communications system 400 that supports flexible transport blocks in accordance with one or more aspects of the present disclosure. The wireless communications system 400 includes a transmitting communication device 402 and receiving communication device 404. For illustration purpose, the transmitting communication device is a base station and the receiving communication device is a UE.

At 406, the transmitting base station 402 may transmit a signaling message. One example of such a signaling message may be a physical downlink control channel (PDCCH). The signaling message may include an indication of which code block groups (CBGs) are included in one or more upcoming transmissions. For an existing NR system, up to 8 CBGs may be allocated for one transmission at the transmitting base station 402. Instead of transmitting all of the allocated CBGs in a new transmission, the transmitted signaling message may indicate a subset of CBGs to be transmitted in one slot. As such, a TB may be transmitted over multiple slots. The signaling message may also include an indicator for the receiver to send back ACK/NACKs for the CBGs received.

In the present disclosure, the term flexible TB refers to a TB that may spread over more than one slot within a TO while the TB size (TBS) is fixed as specified in a standard specification such as relevant 3GPP specifications. In other words, the TB is flexible in terms of the number of CBGs that can be transmitted in a TO and the number of slots over which the CGBs that may be transmitted within the TO. In this aspect, an actual TB size may be flexible as opposed to the fixed size of a standard TB. The flexible TB is based on the standard TB and has the flexibility to carry more CBGs for a given TO.

At 408, the receiving UE 404 may determine the information related to the flexible TB. The information may include which subset of the CBGs to expect in upcoming transmissions for the current TO. The receiving UE may also determine a sequence of the subsets of CBGs within the expected TB. In one example aspect, the receiving UE 404 may also determine the HARQ process ID, ACK/NACK resource allocation for the transmission, whether the TB is a smaller one, and whether the expected transmissions are new transmissions or retransmissions.

At 410, in one example aspect, the receiving UE 404 receives the indicated TB in one or more transmissions from the transmitting base station 402. In one example aspect, the receiving 404 may determine a received transmission is a new transmission or a retransmission. The receiving UE 404 may receive multiple subset of CBGs without sending any ACK/NACK for the received CBGs until the expected number of CBGs has been received.

Also, at 410, the transmitting base station 402 may transmit a flexible TB with some of the CBGs being empty. When the transmitting base station 402 has a limited amount of data to transmit, the BA transmitter may transmit data in a limited number slots. In one example aspect, if the number of code blocks to be transmitted is smaller than the number of CBGs configured, then some CBGs may be empty in a slot.

At 412, the receiving UE 404 may recover the entire flexible transport block after receiving the expected number of subsets of CBGs. As indicated above, the receiving UE 404 may know from the received signaling message which subsets of CBGs to expect for the current TO. The receiving UE 404 may concatenate the received CBGs based on the known sequence of the CBGs and recover the entire flexible TB.

Also, at 412, the receiving UE 404 may determine an ACK/NAK bit map for the entire TB, one bit per CBG. Furthermore, at 412, the receiving UE 404 may determine an actual TB size (TBS) of the TB indicated in the received signaling message. If a TB is limited within a slot, determining the TBS may be based on the available resource in the granted slot. In case the TB spreads over multiple slots, a temporary TBS is computed first, using the defines way as for the fixed TBS of the regular transport block. Then the temporary TBS is scaled up by a ratio of a number of CBGs configured to the number of CGBs included in the received transmissions.

At 414, the receiving UE 404 transmits the ACK/NACK bitmap that has been determined at 412. At 416, the transmitting base station 402, upon receiving the ACK/NACK bitmap, may retransmit only those CBGs that have been NACKed. The transmitting base station 402 may retransmit the NACKed CBGs with the same HARQ process ID, and the same new data indicator. The new data indicator is set to a value indicating it is a retransmission rather than a new transmission.

FIG. 4 illustrates one example message flow between the transmitting base station 402 and the receiving UE 404. Other alternative or additional message flow, alternative or additional steps in the message flow, and alternative or addition fields in each message or action are all possible, without deviation from the spirit of the present disclosure.

Figure 5:
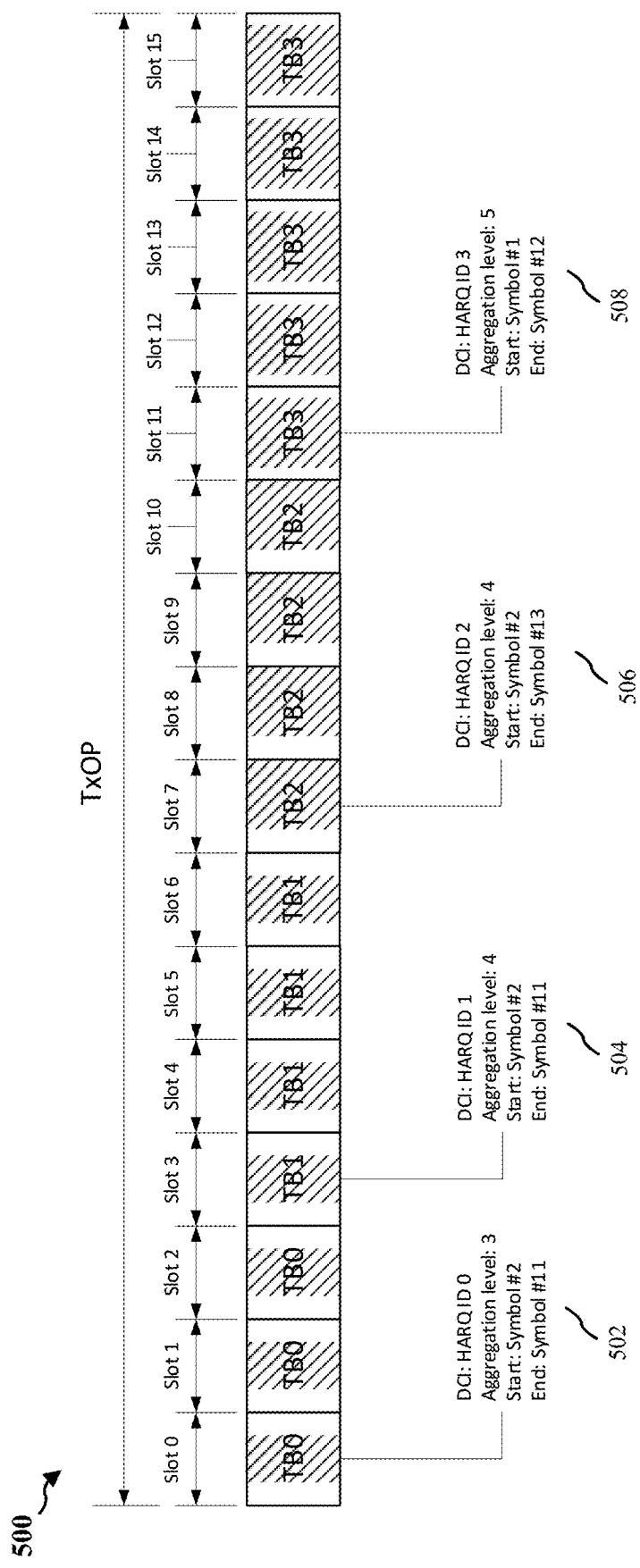
FIG. 5 is a block diagram illustrating a slot aggregation example in accordance with one or more aspects of the present disclosure.

FIG. 5 is a block diagram illustrating a slot aggregation example 500 in accordance with one or more aspects of the present disclosure. Slot aggregation is an alternative approach to extending a regular slot to accommodate a flexible TB to have an improved utilization of a transmission opportunity. The slot aggregation example 500 includes four slot aggregations 502, 504, 506, and 508. The configuration of a slot aggregation may be accomplished via a signaling message from a transmitting base station to a receiving UE. In one example aspect, the signaling message is a radio resource control (RRC) message. The signaling message may include a downlink control information (DCI) field to configure a slot aggregation. Included in the DCI may be a HARQ process ID associated with the flexible TB, a starting point within a slot and ending point within another slot of the aggregation, and an aggregation level. The aggregation level indicates a number of slots within this aggregation. For example, the aggregation 502 for transport block 0 includes a HARQ process ID 0, a starting point of symbol #2 within slot 0 and ending point of symbol #11 of slot 2. The DCI field also includes an aggregation level of 3, indicating that 3 slots, Slot 0 to Slot 2 are included in the aggregation 502. Each of the four slot aggregations, 502, 504, 506, and 508, is for one TB, i.e., TB0 through TB3 respectively.

Figure 6:
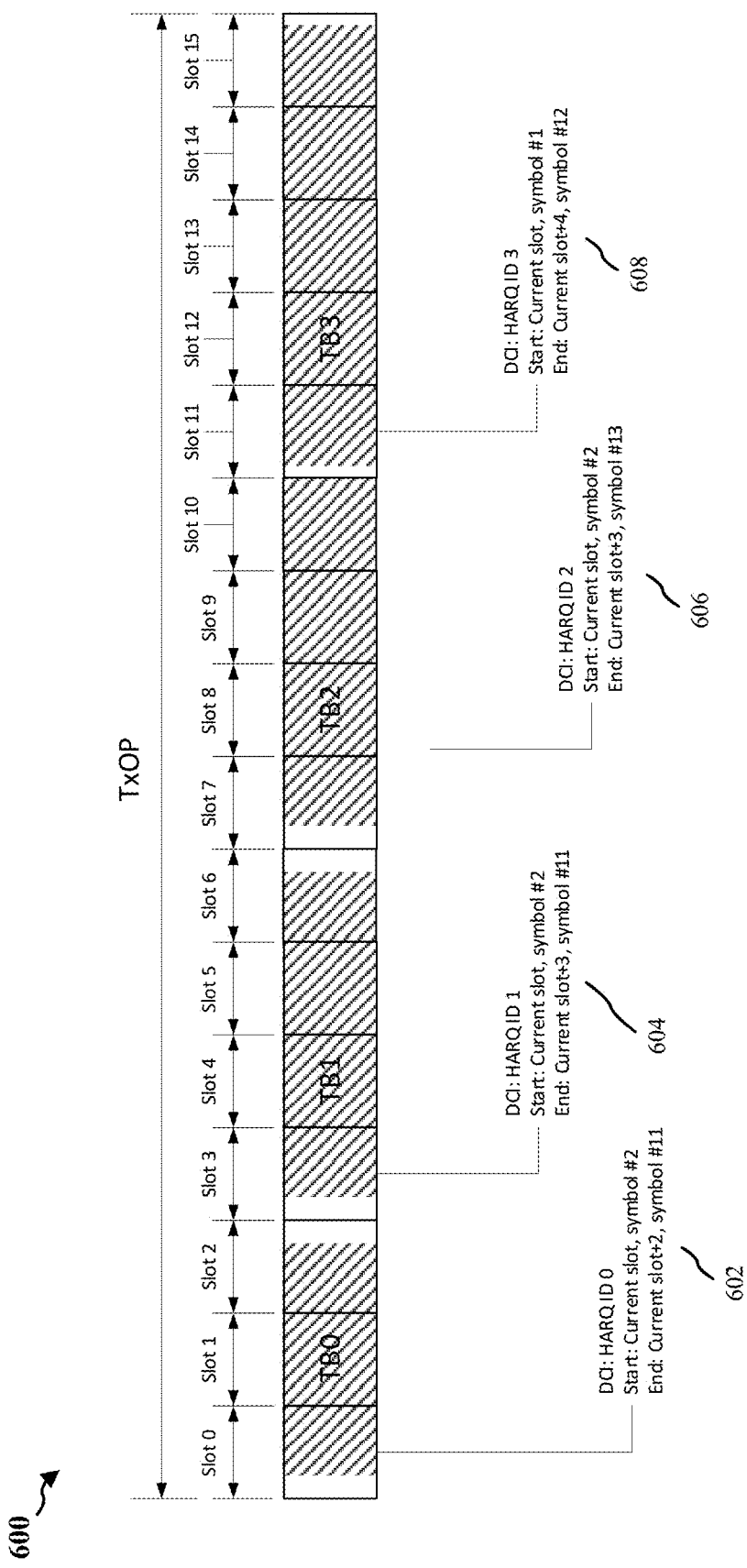
FIG. 6 is a block diagram illustrating an extended slot structure in accordance with one or more aspects of the present disclosure.

FIG. 6 is a block diagram illustrating an extended slot structure 600 in accordance with one or more aspects of the present disclosure. The extended slot structure is another alternative approach to extending a regular slot to accommodate a flexible TB to have an improved utilization of a transmission opportunity.

The configuration of an extended slot may be accomplished through a signaling message from a transmitting base station to a receiving UE. The signaling message may include an indication of a longer slot for the flexible TB. In one example aspect, the signaling message is a radio resource control (RRC) message. In one example aspect, the signaling message may include a DCI that includes a beginning symbol and an ending symbol, for the extended slot. As such, the longer slot can accommodate a flexible TB with multiple CBGs that may go over a regular slot. In one example aspect, the longer slot may have more than 14 symbols, depending on a specific SCS. For example, for a 960 Khz SCS, the longer slot may have 28 or 56 symbols. With the longer slot, the receiving UE can find a flexible TB within one slot.

The DCI field of the signaling message may include a HARQ process ID for the extended slot, a starting point, and an ending point of the extended slot. For example, for the extended slot 602, the DCI field includes a HARQ process ID 0, a starting point of symbol #2 of the current slot, Slot 0, and an ending point of symbol #11 of current slot+2, i.e., Slot 2. Similarly, the DCI fields for the extended slots 604, 606, and 608 include similar information.

Figure 7:
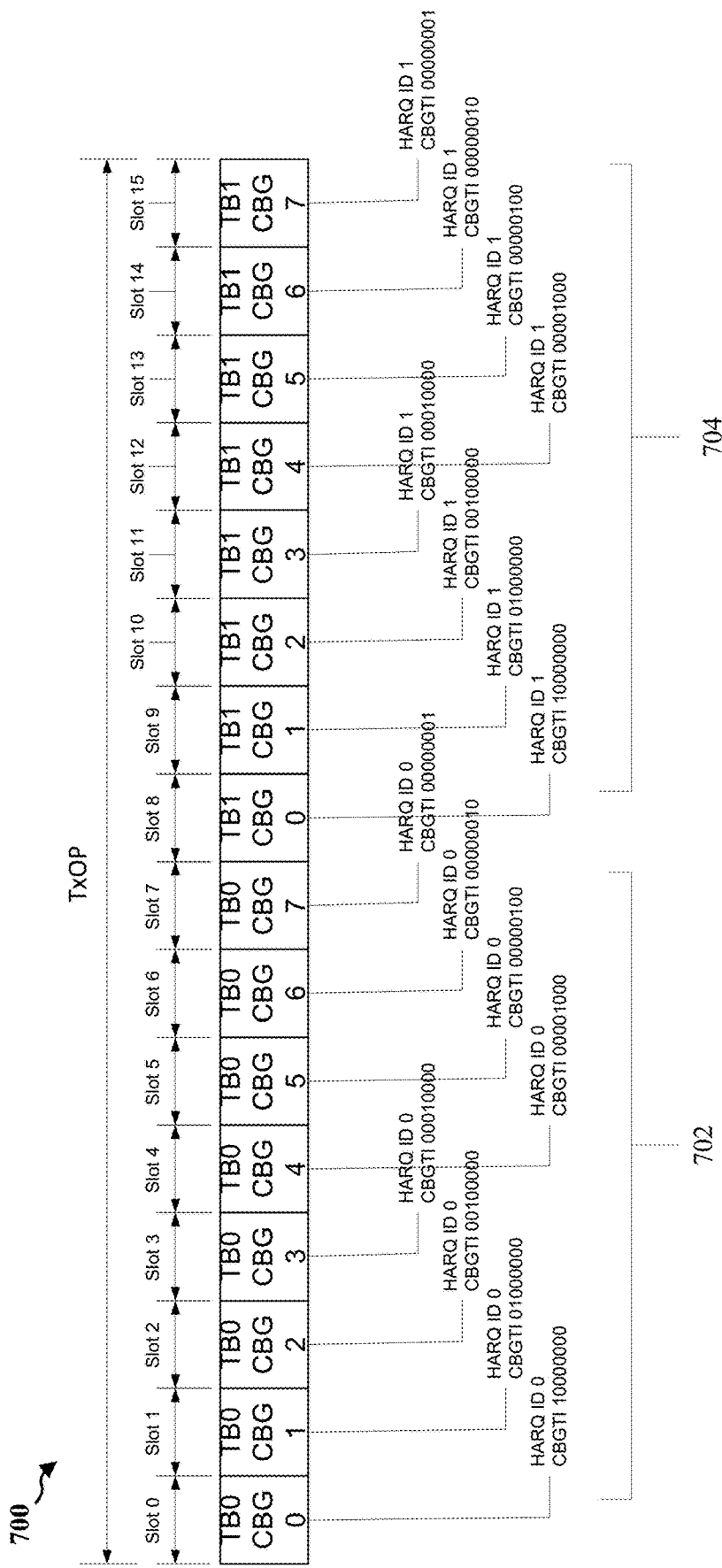
FIG. 7 is a block diagram illustrating a code block group based ACK/NACK mechanism in accordance with one or more aspects of the present disclosure.

FIG. 7 is a block diagram illustrating an extended CBG based ACK/NACK mechanism 700 in accordance with one or more aspects of the present disclosure. The CBG based ACK/NACK mechanism 700 includes two flexible TBs for one transmission opportunity, i.e., TB0 702 and TB1 704. Each TB may include multiple CBGs. For instance, the TB0 702 includes eight CBGs, from CBG0 to CBG7. The TB1 704 also includes eight CBGs, from CBG0 to CBG7.

A receiver, such as a receiving UE, may receive a signaling message from a transmitter such as a transmitting base station, to configure a flexible TB. Included in the signaling message are a HARQ ID, and a cod block group transmission indicator (CBGTI) field, among others. The same HARQ ID is shared across multiple CBGs of the flexible TB. For example, the same HARQ ID 0 is used for all CBGs of flexible TB 0 702 and HARD ID 1 for all CBGs of the flexible TB 1 704. The implication is that the receiving UE may receive all CBG 0 through CBG 7, without sending back any ACK/NACK. The transmitting base station may continue sending data for CBG 0 through CBG 7, without waiting for any ACK/NACK. One effect of this scheme is that either the receiver or/and the sender may make better utilization of the transmission opportunity and receive/send up to eight CBGs worth of data without sending or waiting for an ACK/NACK.

The CBGTI field in the signaling message, a bitmap field, allows the sender to notify the receiver which CBGs are included in the flexible TB. For example, 10000000 indicates that the first CBG, CBG 0, is included in the flexible TB. Similarly, 01000000 indicates that the second CGB, CBG 1, is included in the transmission. In one example aspect, the CBGTI field includes only 8 bits, meaning that a maximum of 8 CBGs may be configured for a flexible TB. In an alternative design, different number of bits may be used for the CBGTI field to accommodate different number of CBGs within a flexible TB. Also, it is worth noting that such a CBG-based flexible TB structure allows a TB spread over multiple slots. For example, each of TB0 and TB1 spreads over eight slots.

The CBG based ACK/NACK scheme 700 is an example design of flexible TB. Other alternative or additional designs based on the concept of bundling ACK/NACK bits for CBGs for a flexible TB, one bit per CBG, to extend a TB beyond one slot shall all be within the spirit of the present disclosure.

Figure 8:
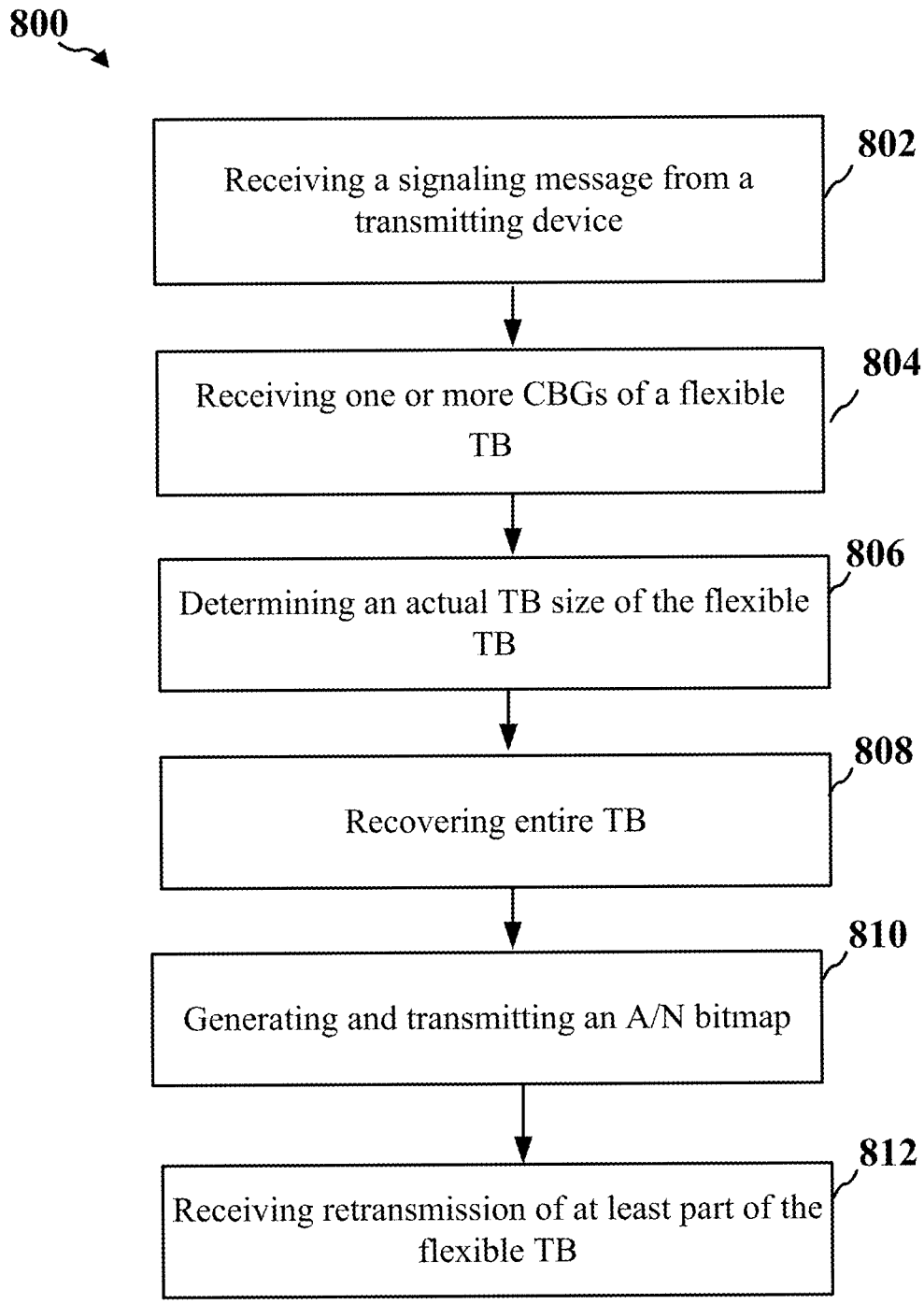
FIG. 8 is a flowchart of a method of wireless communication in accordance with one or more aspects of the present disclosure.

FIG. 8 is a flowchart for a method 800 of wireless communication in accordance with one or more aspects of the present disclosure. The method 800 may be performed by a receiving UE, such as one of the UEs 104 of FIG. 1, the UE 350 of FIG. 3, the UE 404 of FIG. 4, or apparatus 902/902' of FIGS. 9 and 10. The method 800 may also be performed by a receiving base station, such as the base station 310 of FIG. 3, 402 of FIG. 4 or 102 of FIG. 1. For illustration purpose, a receiving UE is assumed to perform the steps of the method 800. An optional step is indicated in a dashed boarder.

At 802, the method 800 includes receiving a signaling message from a transmitter of an associated communication device. In one example instance, the transmitter of the associated communication device is a transmitting base station. The receiving UE may receive a signaling message from the base station indicating various information related to a flexible transport block (TB).

In one example aspect, the signaling message may be a physical downlink control channel (PDCCH). The signaling message may include an indication of which code block group (CBG) are included in one or more upcoming transmissions of data. According to the current NR standards, up to 8 CBGs may be allocated for one transmission. Instead of transmitting all of the allocated CBGs for a TB in a new transmission, a subset of CBGs may be transmitted in a slot. As such, a flexible TB may spread over multiple slots.

In one example aspect, the signaling message may include a DCI field. The DCI field may include a code block group transmission indicator (CBGTI) field to indicate which CBGs are included the current transmission. In one example aspect, the number of CBGs that can be configured at the UE is N<=8. Note that the CBGs of a flexible TB may spread over multiple slots. For example, as indicated in FIG. 7 above, the received CBGTI may include 10000000 to indicate CGB 0 is included in slot 0. For slot 1, CBGTI may include 01000000 to indicate that CBG 1 is included in slot 1.

The receiving UE may also receive from the signaling message, various information related to the flexible TB. The information may include which subset of the CBGs to expect in upcoming transmissions for the current TO. The receiving UE may also determine a sequence of the subsets of CBGs within the expected TB, based on the received signaling message. In one example aspect, the receiving UE may also determine whether the expected transmissions are new transmissions or retransmissions based on an indicator from the signaling message, HARQ process ID, ACK/NACK resource allocation for the configured CBGs, whether the TB is one that include empty CBGs.

In an alternative embodiment, the signaling message may include an indication of slot aggregation for the flexible TB. In one example aspect, the signaling message is a radio resource control (RRC) message. The signaling message may configure a fixed time slots for aggregation. For example, slots 1, 2, 4, and 8 may be designated for aggregation.

In another alternative embodiment, the signaling message may also include an indication of an extended slot for the flexible TB. In one example aspect, the signaling message is a radio resource control (RRC) message. The signaling message may include a DCI field that includes a beginning symbol and an ending symbol for the extended slot. As such, the extended slot can accommodate a flexible TB with multiple CBGs that may go over a regular slot. In one example aspect, the extended slot may have more than 14 symbols, depending on a specific SCS. For example, for a 960 Khz SCS, the longer slot may have 28 or 56 symbols. With the longer slot, the receiving UE may fit a flexible TB within one slot.

At 804, the method 800 includes receiving one or more CBGs from the base station, each transmission for a subset of the configured CBGs. The receiving UE may receive the flexible TB in one or more transmissions from the transmitting base station. In one example aspect, the receiving UE may determine a received transmission is a new transmission or a retransmission based on a new data indicator. The receiving UE receive multiple subset of CBGs without sending any ACK/NACK until the expected number of CBGs has been received.

Also, at 804, in one example aspect, the receiving UE may receive a flexible TB with some of the CBGs being empty. With a limited amount of data to transmit, the transmitting BS may transmit data in a limited number slots. In one example aspect, if the number of code blocks to be transmitted is smaller than the number of CBGs configured, then some empty CBGs may be in a slot.

In an alternative embodiment, the receiving UE may receive a flexible TB in the aggregation of slots, as described above. The flexible TB may spread across multiple aggregated slots and be rate matched across the multiple slots. The receiving UE may follow a predefined sequence of revision version IDs that was received in the signaling message as described above. In one example aspect, the receiving UE may receive and decode the flexible TB in designated slots such as slots 1, 2, 4, and 8.

In another alternative embodiment, the receiving UE may receive the flexible TB in the extended slot, as described above, based on the received indication of an extended slot for the flexible TB. The flexible TB may start at a starting symbol and ends at the ending symbols as indicated in the signaling message. Because the extended slot can accommodate a flexible TB within the slot, the receiving UE may determine the actual number of symbols within the slot from the received signaling message. With the extended slot, the receiving UE may find a flexible TB within one slot.

At 806, the method 800 includes determining an actual TB size. As discussed above, the term flexible TB refers to a TB that may spread over more than one slot within a TO while the TB size is fixed as specified in a standard specification such as relevant 3GPP specifications. In other words, the TB is flexible in terms of the number of CBGs that may be transmitted within a TO and the number of slots over which the CGBs that may be transmitted. In this sense, an actual TB size may be flexible as opposed to the fixed size of a standard TB. The flexible TB is based on the standard TB and has the flexibility to carry more CBGs for a given TO.

In one example aspect, the receiving UE may determine an actual TB size (TBS) of the TB. If the TB fits within a slot, determining the TBS may be based on the available resource in the received grant, as the TBS is traditionally determined. Because the TB may spread over multiple slots, a standard TBS is computed first, using the regular way as for a standard TB. Then the standard TBS is scaled up by a scaling ratio of a number of CBGs configured to the number of CGBs included in the received transmission(s). Such a scaling rule allows the receiving UE to derive the actual TBS size of the flexible TB quickly. In one example aspect, a CB segmentation rule may be taken into consideration in determination of a TBS.

For example, in one example aspect, a CBGTI with the value of 10000000, the receiving UE may determine to scale up the TBS 8 times. As another example, given a CBGTI of 11000000, the receiving UE may determine to scale up that TBS 4 times. In an alternative embodiment, the scaling ratio may be sent to the receiving UE via a signaling message.

At 808, the method 800 includes recovering a complete TB from the received CBGs. The receiving UE may recover the entire flexible TB after receiving the expected number of subsets of CBGs. As indicated above, the receiving UE has the knowledge of which subsets of CBGs to expect for the current transmission opportunity, based on the received signaling message. The receiving UE may concatenate the received CBGs based on a known sequence of the CBGs and recover the entire flexible TB.

At 810, the method 800 includes determining and transmitting to the transmitting base station an ACK/NACK bitmap. The receiving UE may determine an ACK/NAK bit map for the entire flexible TB, one bit per CBG. That is, the number of bits of the bitmap equals the number of configured CBGs. If the receiving UE fails to decode one code block within a CBG, a NACK bit is set for the entire CBG.

At 812, the method 800 includes receiving retransmission of at least part of the flexible TB. The receiving UE may receive a retransmission of a subset of the CBGs of the flexible TB, using the same HARQ process ID and the same new data indicator (NDI) for the initial transmission of the subset of CBGs. The NDI is set to a value indicating this is not a new transmission. The subset of CBGs that are retransmitted are those that have been NACKed by the receiving UE at 810.

The method 800 is for illustration purpose and shows one possible process for determining and receiving a flexible TB. In practice, one or more steps shown in illustrative flowchart for the method 800 may be combined with other steps, performed in any suitable order, performed in parallel (e.g., simultaneously or substantially simultaneously), or removed.

Figure 9:
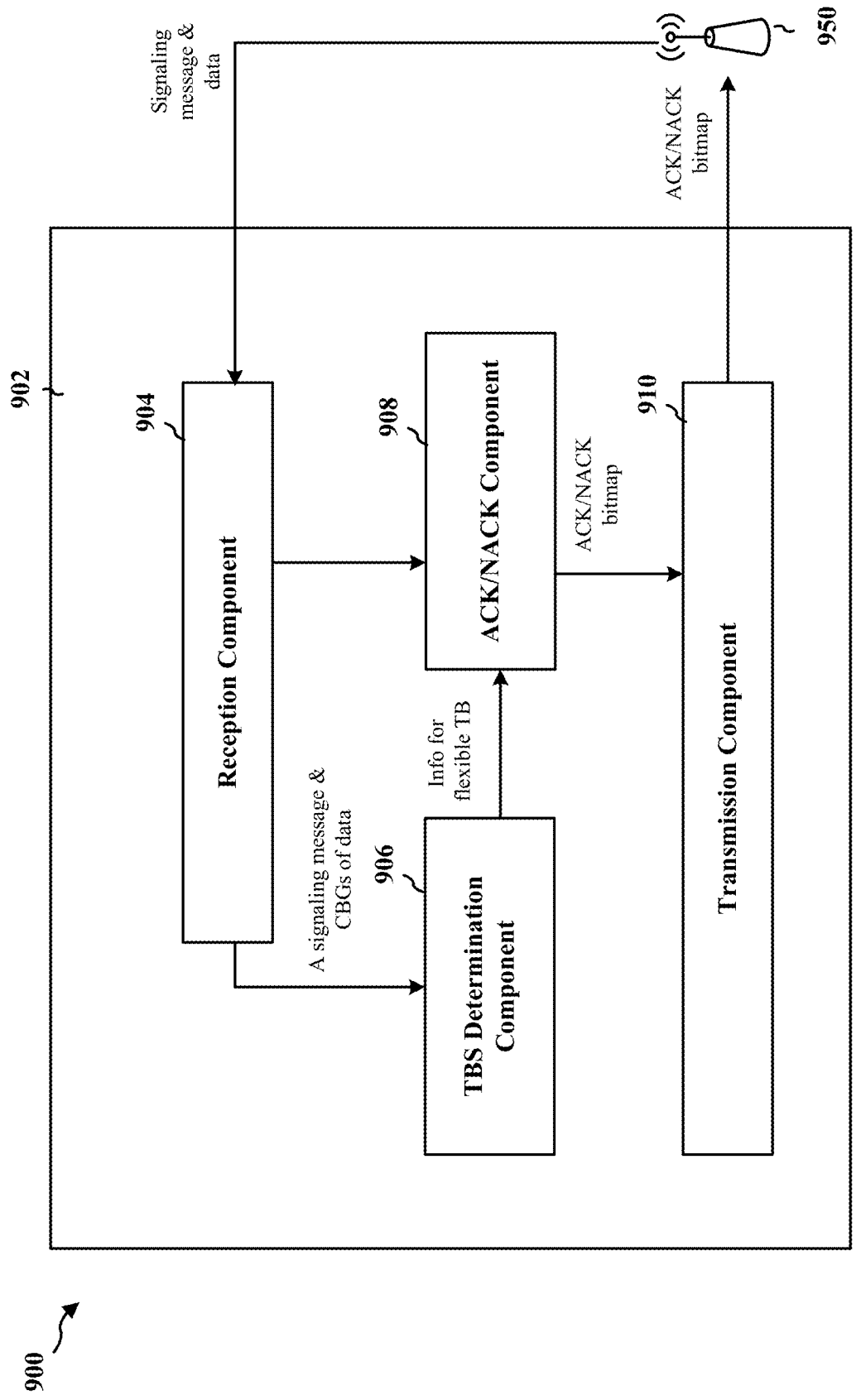
FIG. 9 is a conceptual data flow diagram illustrating the data flow between different means/components in an exemplary apparatus in accordance with one or more aspects of the present disclosure.

FIG. 9 is a conceptual data flow diagram 900 illustrating the data flow between different means/components in an exemplary apparatus 1002. The apparatus may be a receiving UE in communication with a transmitting base station. The apparatus includes a reception component 904 that is configured to receive data and control information from the transmitting base station. For example, the reception component 904 of the receiving UE may receive a signaling message from the transmitting base station to configure a flexible TB.

The apparatus 902 also includes a TBS determination component 906 that receives the signaling message from the reception component 904, and determine actual size of the flexible TB. The apparatus 902 also includes an ACK/NACK component 908 that receives actual size information of flexible TB from the TBS determination component 1006, determine a ACK/NACK bitmap. The apparatus 902 further includes the transmission component 910 that transmits the ACK/NACK bitmap to the transmitting base station 950.

The apparatus may include additional components that perform each of the blocks of the algorithm in the aforementioned flowcharts of FIGS. 4 and 8. As such, each block in the aforementioned flowcharts of FIGS. 4 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
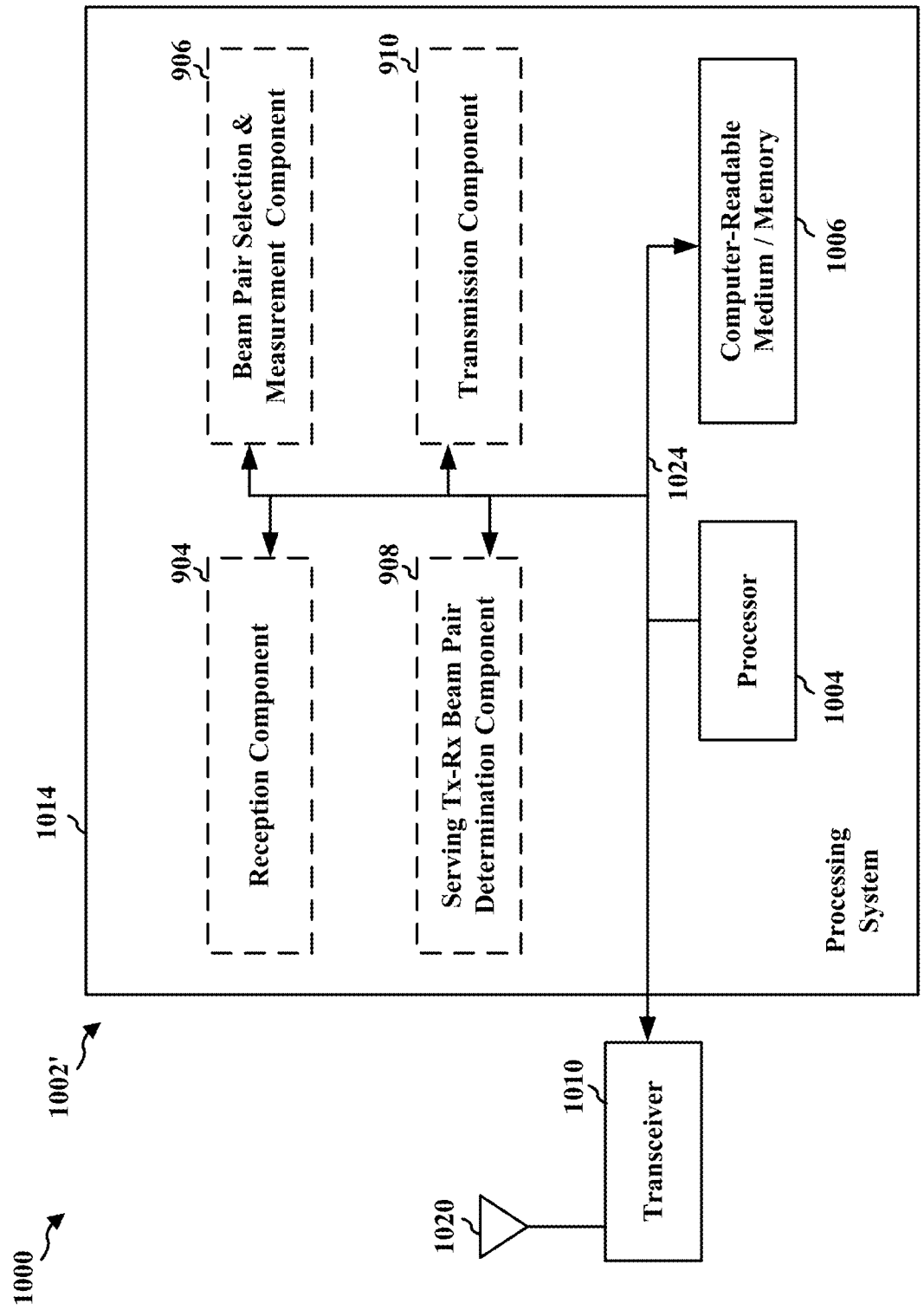
FIG. 10 is a diagram illustrating an example of a hardware implementation for an apparatus employing a processing system in accordance with one or more aspects of the present disclosure.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, and 910, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the transmission component 910. In addition, the transceiver 1010 receives information from the processing system 1014, specifically the reception component 904, and based on the received information, generates a signal to be applied to the one or more antennas 1020.

The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, and 910. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359.

FIG. 11 is a flowchart for a method 1100 of wireless communication in accordance with one or more aspects of the present disclosure. The method 1100 may be performed by transmitting base station, such as one of the base station 310 of FIG. 3, 402 of FIG. 4 or 102 of FIG. 1. The method 1100 may also be performed by a transmitting UE, such as the UEs 104 of FIG. 1, the UE 350 of FIG. 3, the UE 404 of FIG. 4, or apparatus 902/902' of FIGS. 9 and 10. For illustration purpose, a transmitting base station is assumed for the method 1100. An optional step is indicated in a dashed boarder.

At 1102, the method 1100 includes transmitting a signaling message from a transmitting communication device. One example of the signaling message may be carried a physical downlink control channel (PDCCH). The signaling message may include an indication of which code block groups (CBGs) are included in one or more transmissions of data. Based on current NR specifications, up to 8 CBGs may be allocated for a TB. Instead of transmitting all of the allocated CBGs in a new transmission, only a subset of CBGs may be transmitted in a slot. This way, a flexible TB may spread over multiple slots.

In one example aspect, the signaling message may include a downlink control indicator (DCI) field. The DCI may include a code block group transmission indicator (CBGTI) field to indicate which CBGs are included the current TB. In one example aspect, the number of CBGs that can be configured at the UE is N<=8. Note that the CBGs of a flexible TB may spread over multiple slots. For example, as indicated in FIG. 7 above, the CBGTI field may include 10000000 to indicate CGB 0 is included in slot 0. The CBGTI field may include 01000000 to indicate that CBG 1 is included in slot 1.

The signaling message may also include a grant for resources for the receiving UE to send back ACK/NACK for the configured CBGs. The ACK/NACK resource grant is on a per slot basis.

The transmitting base station may also include in the signaling message, various information related to the flexible TB. The transmitting base station may include also a sequence of the subsets of CBGs within the expected TB. In one example aspect, the transmitting base station may also include in the signaling message one or more HARQ process IDs, an indication of whether the flexible TB include any empty CBGs, and an indicator whether the expected transmissions are new transmissions or retransmissions.

In an alternative embodiment, the signaling message may include an indication of slot aggregation for the flexible TB. In one example aspect, the signaling message is a radio resource control (RRC) message. The signaling message may configure a fixed time slots for aggregation. For example, slots 1, 2, 4, and 8 may be designated for aggregation.

In another alternative embodiment, the signaling message may also include an indication of an extended slot for the flexible TB. In one example aspect, the signaling message is a radio resource control (RRC) message. In one example aspect, the signaling message may include a DCI field that includes a beginning symbol and an ending symbol, for the extended slot. As such, the extended slot can accommodate a flexible TB with multiple CBGs that may go over a regular slot. In one example aspect, the extended slot may have more than 14 symbols, depending on a specific SCS. For example, for a 960 Khz SCS, the extended slot may have 28 or 56 symbols. With the extended slot, the transmitting base station may fit a flexible within one slot.

At 1104, the method 1100 includes transmitting one or more CBGs to the receiving UE, each transmission for a subset of CBGs. The transmitting base station may transmit the flexible TB in one or more transmissions to the receiving UE. In one example aspect, the transmitting base station may send multiple subset of CBGs without waiting for any ACK/NACK from the receiving UE, until the configured number of CBGs has been transmitted.

The transmitting BS may transmit a flexible TB with some of the CBGs being empty. With a limited amount of data to transmit, the transmitting BS may transmit data in a limited number slots. In one example aspect, if the number of code blocks to be transmitted is smaller than the number of CBGs configured, then some empty CBGs may be in a slot.

In an alternative embodiment, the transmitting base station may transmit a flexible TB in an aggregation of slots. The flexible TB may spread across multiple aggregated slots and be rate matched across the multiple slots. The transmitting base station may also indicate a predefined sequence of revision version IDs that in the signaling message. In one example aspect, the transmitting base station may transmit in designated slots such as slots 1, 2, 4, and 8.

In another alternative embodiment, the transmitting base station may transmit the flexible TB in an extended slot. The flexible TB may start at a starting symbol and ends at the ending symbols as indicated in the signaling message. Because the extended slot can accommodate a flexible TB within the slot, the transmitting base station may fit actual number of symbols within the slot. In one example aspect, the transmitting base station may transmit 28 or 56 symbols in the extended slot. With the extended slot, the transmitting base station may transmit an entire flexible TB in one slot.

At 1106, the method 1100 includes determining an actual TB size. The transmitting base station may optionally determine the actual TB size for such purpose as resource allocation and monitoring. As discussed above, the term flexible TB refers to a TB that may spread over more than one slot within a TO while the TB size is fixed as specified in a standard specification such as relevant 3GPP specifications. In other words, the TB is flexible in terms of the number of CBGs that may be transmitted within a TO and the number of slots over which the CGBs that may be transmitted. In this sense, an actual TB size may be flexible as opposed to the fixed size of a standard TB. The flexible TB is based on the standard TB and has the flexibility to carry more CBGs for a given TO.

If the flexible TB fits within a slot, determining the TBS may be based on the available resource in the grant sent to the receiving UE, as the TBS is traditionally determined. If the flexible TB spreads over multiple slots, a standard TBS is computed first, using the defined way as for the standard TB. Then the standard TBS is scaled up by a scaling ratio of a number of CBGs configured to the number of CGBs included in the received transmission(s). Such a scaling rule allows the receiving UE to derive the actual TBS size of the flexible TB quickly.

At 1108, the method includes receiving an ACK/NACK bitmap for the transmitted CBGs. At 1110 The transmitting BS, upon receiving the ACK/NACK bit map, may retransmit only those CBGs that have been NACKed. The transmitting base station may retransmit the NACKed CBGs with the same HARQ process ID, and a same new data indicator. The new data indicator is set to a value indicating it is not a new transmission.

The method 1100 is for illustration purpose and shows one possible process for determining and transmitting a flexible TB. In practice, one or more steps shown in illustrative flowchart for the method 1100 may be combined with other steps, performed in any suitable order, performed in parallel (e.g., simultaneously or substantially simultaneously), or removed.

Figure 12:
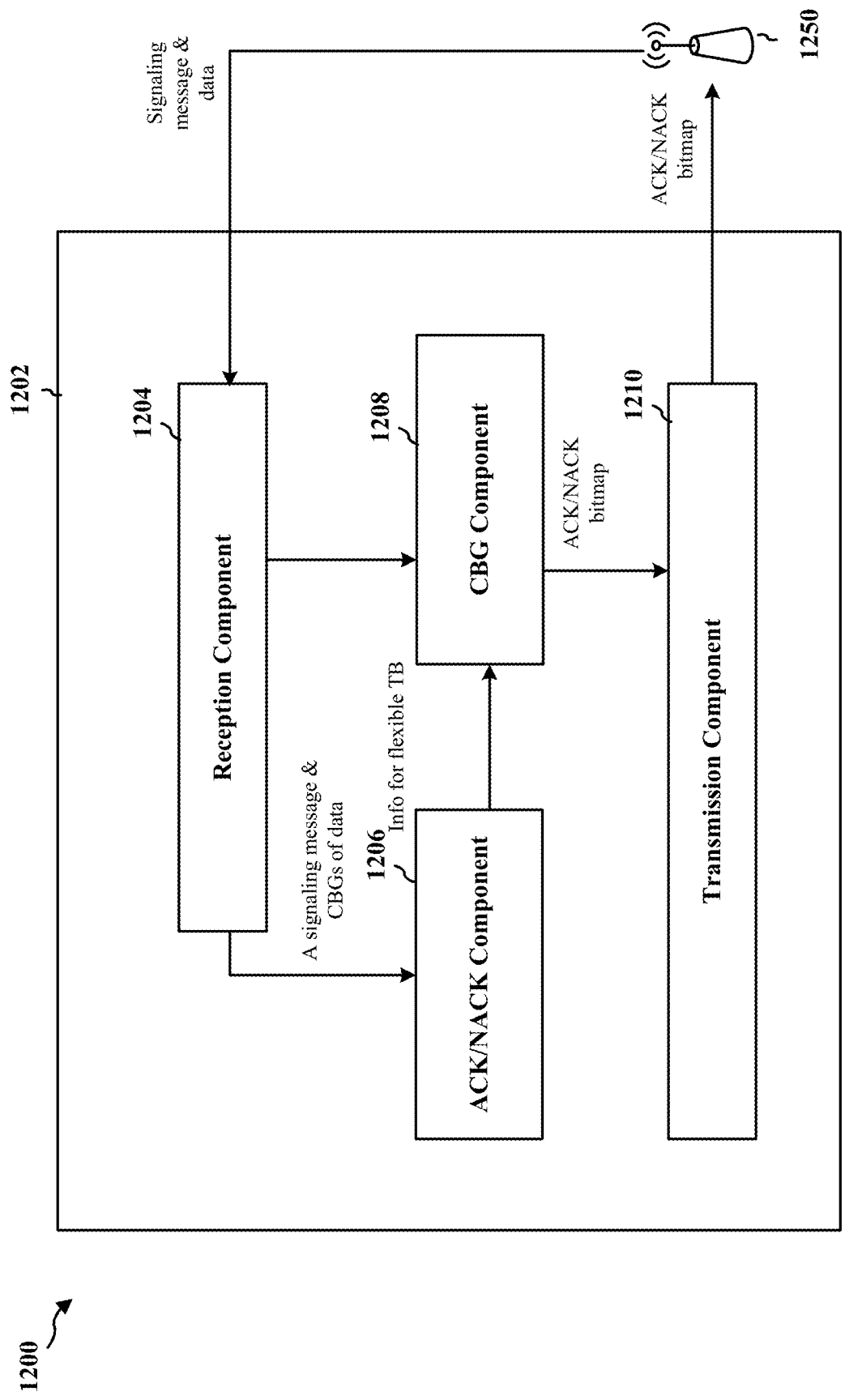
FIG. 12 is a conceptual data flow diagram illustrating the data flow between different means/components in an exemplary apparatus in accordance with one or more aspects of the present disclosure.

FIG. 12 is a conceptual data flow diagram 1200 illustrating the data flow between different means/components in an exemplary apparatus 1202. The apparatus may be a transmitting base station in communication with a receiving UE. The apparatus includes a reception component 1204 that is configured to receive data and feedback from the receiving UE. For example, the reception component 1204 of the transmitting base station may receive an ACK/NACK bitmap for the CBGs sent by the transmitting base station.

The apparatus 1202 also includes an ACK/NACK component 1206 that may receive the ACK/NACK bitmap from the reception component 1204, and determine retransmission of CBGs that are NACKed. The apparatus 1202 also includes an CBG component 1208 that may receive ACK/NACK information from ACK/NACK component 1006, and determine and configure CBGs for a flexible TB. The apparatus 1202 further includes the transmission component 1210 that transmits DL data and a signaling message to the receiving UE 1250 to configure the CBGs for the flexible TB.

The apparatus may include additional components that perform each of the blocks of the algorithm in the aforementioned flowcharts of FIGS. 4 and 8. As such, each block in the aforementioned flowcharts of FIGS. 4 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
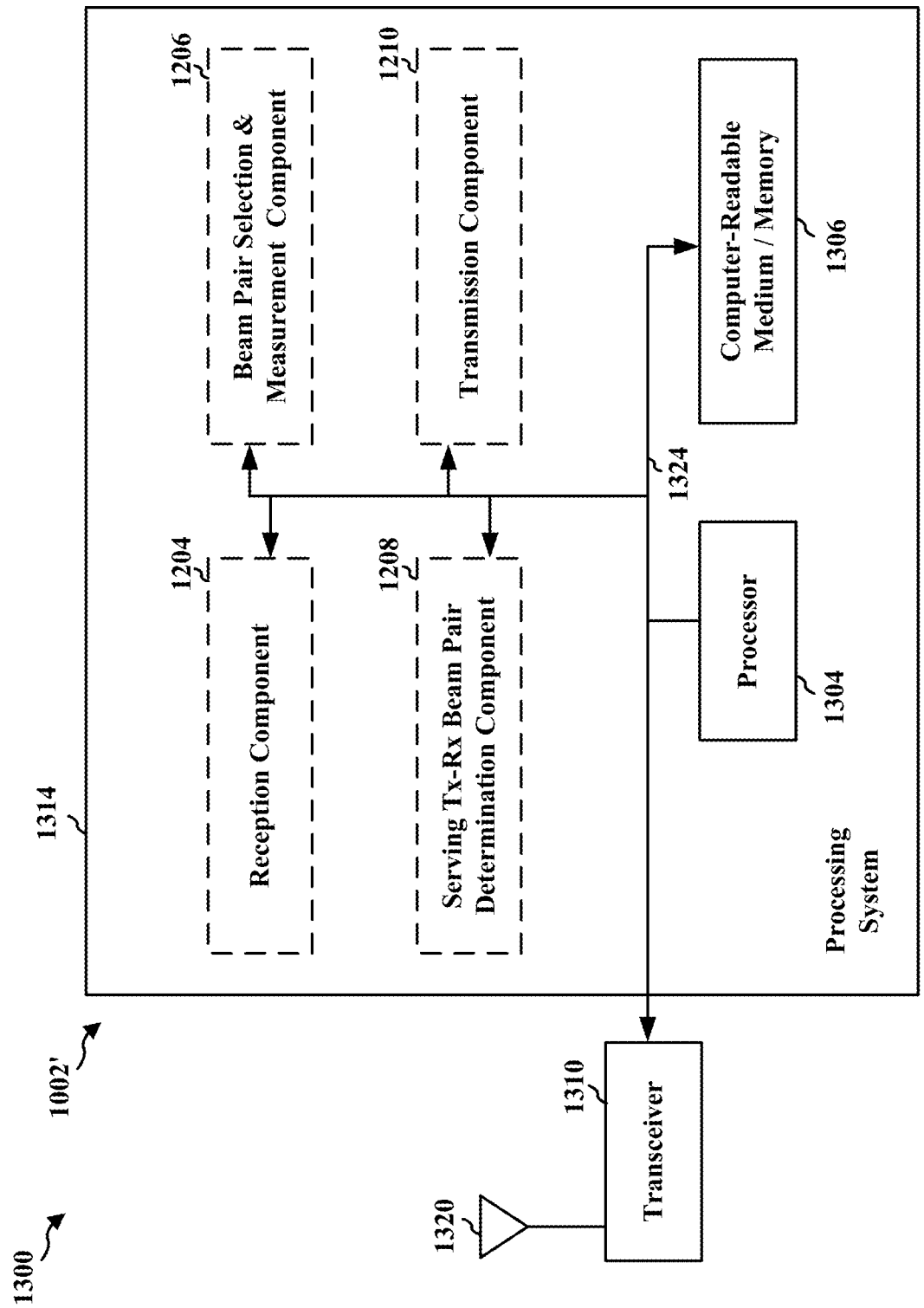
FIG. 13 is a diagram illustrating an example of a hardware implementation for an apparatus employing a processing system in accordance with one or more aspects of the present disclosure.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, and 1210, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the transmission component 1210. In addition, the transceiver 1310 receives information from the processing system 1314, specifically the reception component 1204, and based on the received information, generates a signal to be applied to the one or more antennas 1320.

The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, and 1210. The components may be software components running in the processor 1304, resident/stored in the computer readable medium/memory 1306, one or more hardware components coupled to the processor 1304, or some combination thereof. The processing system 1314 may be a component of the UE 350 and may include the memory 360 and/or at least one of the TX processor 368, the RX processor 356, and the controller/processor 359.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The present disclosure also includes an alternative approach to maximizing the utilization of a transmission opportunity by recycling a HARQ process for bundled ACK/NACKs across TBs for a burst of data transmissions. According to one aspect of the present disclosure, a transmitting base station may keep sending data without any feedback from a receiving UE for a given HARQ process. In an example aspect, when all HARQ processes have been exhausted, the transmitting base station may re-use or recycle one of the HARQ process IDs for a new TB, without waiting for an ACK/NACK for the TB in the previous transmission of the same HARQ process. The transmitting base station may set an indicator to indicate to the receiving UE that it is not a new transmission. In one example aspect, the indicator is a new data indicator (NDI).

On the receiving UE side, the UE bundles ACK/NACKs for all TBs associated with the same HARQ process and sends a bundled ACK/NACK feedback when an uplink channel is available. The UE may send a NACK when at least one TB in the HARQ process fails. After the receiving UE sends the bundled ACK/NACK feedback, the UE resets the ACK/NACK field for the next bundled ACK/NACK feedback.

A field to keep track of a total number of times that a HARQ process has been re-used may help further improve the reliability of bundled ACK/NACK feedbacks across TBs. In one example aspect, a field similar to a downlink assignment indicator (DAI) may be used to detect any missing grant by the receiving UE. The transmitting base station may increment the DAI-like field each time a HARQ process is used again. As such, the DAI-like field may be used to keep track a total number of times that a HARQ process has been re-used or recycled. The DAI-like field may be included in a DCI sent from the transmitting base station to the receiving UE. Because a grant is sent to the receiving UE for each new TB, the receiving UE may use the DAI-like field included in the DCI to detect any missing grant.

Another alternative approach to maximizing the utilization of a transmission opportunity is to send multiple ACK/NACKs across TBs with the same HARQ process for a burst of data transmissions from a transmitting base station to a receiving UE. Instead of bundling ACKs/NACKs across different TBs, as described above, multiple ACKs/NACKs may be transmitted for the same HARQ process for different TBs.

In one example aspect, for a fixed HARQ codebook case where a fixed number of ACKs/NACKs for each HARQ process is used, the base station may configure the number of ACK/NACK bits for each HARQ process. The UE may reset an ACK/NACK field at beginning of the burst of data transmission and fill the ACK/NACK bits sequentially. To improve reliability, a DAI-like field may be used as described above. Or alternatively, an offset field instead of the DAI-like field may be used to indicate to the transmitting base station which ACK/NACK bit in the ACK/NACK bit sequence that a new TB is mapped to. If it happens that multiple TBs are mapped to the same ACK/NACK bit, then the ACK/NACK bundling as described above may be used.

In another example aspect, for a dynamic HARQ codebook case, a common DAI-like field is used across all HARQ processes and all TBs. In one example instance, the DAI-like field is set to 0 at the beginning of the burst of data transmissions by the transmitting base station. Then the base station may increment the DAI-like field for each grant. As such, the DAI-like field may indicate the location of an ACK/NACK bit within the ACK/NACK bit sequence for a TB. The receiving UE may use the received DAI-like field to know the total number of ACK/NACK bits to be sent back to the transmitting base station.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication implemented by a first communication device, comprising:
   receiving a signaling message, the signaling message configuring a flexible transport block (TB), and the signaling message comprising a code block group (CBG) transmission index (CBGTI) indicating which subset of a plurality of CBGs included in the flexible TB, is included in the flexible TB for a new transmission or a retransmission; and
   receiving a first portion of the flexible TB, based on the received signaling message,
   wherein one or more CBGs of the flexible TB indicated in the CBGTI are empty, when a second communication device has a limited amount of data to transmit in the flexible TB.

2. The method of claim 1, wherein each of the CBGs comprising a plurality of code blocks.

3. The method of claim 2, wherein the flexible TB occupies one or more slots.

4. The method of claim 3, wherein the signaling message comprises a grant for each of the one or more slots.

5. The method of claim 4, wherein the first portion of the flexible TB comprises a subset of CBGs.

6. The method of claim 5, further comprising at least one of:
   receiving a second portion of the flexible TB; and
   recovering the entire flexible TB by concatenating at least one of the first portion and the second portion of the flexible TB from multiple slots.

7. The method of claim 4, further comprising at least one of:
   determining and transmitting to a second communication device an Acknowledgement/Negative Acknowledgement (ACK/NACK) bitmap, one bit per received CBG; and
   determining a transport block size (TBS) for the flexible TB, based in part on the grant from the signaling message.

8. The method of claim 7, wherein receiving the first portion of the flexible TB further comprises receiving at least a subset of the CBGs of the flexible TB with a Hybrid automatic repeat request (HARQ) process identifier (ID) and a new data indicator (NDI), without sending an Acknowledgement/Negative Acknowledgement (ACK/NACK) until an expected number of CBGs has been received.

9. The method of claim 4, further comprising determining a transport block size (TBS) for the flexible TB, based in part on the grant from the signaling message.

10. The method of claim 9, further comprising determining an actual TBS for the flexible TB based on a ratio of CBGs configured to CBGs included in the received first portion of the flexible TB, a scaling rule and the transport block size.

11. The method of claim 8, further comprising receiving with the HARQ process ID and the NDI a retransmission of a subset of CBGs that has been NACKed, wherein the NDI is set to a value indicating this is not a new transmission.

12. The method of claim 1, wherein receiving the first portion of the flexible TB comprises receiving the first portion of the flexible TB in aggregated slots, following a predefined sequence of revision version identifiers (RVIDs), wherein the aggregated slots are indicated in the signaling message or pre-configured.

13. The method of claim 1, wherein receiving the first portion of the flexible TB comprises receiving data in an extended slot that is longer than a regular slot and wherein the signaling message indicates a beginning symbol and an ending symbol of the extended slot that extends over one or more slots.

14. The method of claim 7, wherein the first communication device is a user equipment (UE) and the second communication device is a base station.

15. A method of wireless communication implemented by a second communication device, comprising:
   transmitting a signaling message configuring a flexible transport block (TB) for a current transmission opportunity, the signaling message comprising a code block group (CBG) transmission index (CBGTI) indicating which subset of a plurality of CBGs included in the flexible TB, is included in the flexible TB for a new transmission or a retransmission; and
   transmitting a portion of the flexible TB to a first communication device, wherein one or more CBGs of the flexible TB indicated in the CBGTI are empty, when the second communication device has a limited amount of data to transmit in the flexible TB.

16. The method of claim 15, wherein the flexible TB comprise a plurality of code block groups (CBGs), each of the CBGs comprising one or more of code blocks.

17. The method of claim 16, further comprising
receiving an Acknowledgement/Negative Acknowledgement (ACK/NACK) bit map, one bit for each of the CBGs.

18. The method of claim 16, wherein transmitting the portion of the flexible TB comprises transmitting the portion of the flexible TB without waiting for an ACK/NACK until transmissions of all of the CBGs of the flexible TB are finished.

19. The method of claim 16, wherein transmitting the portion of the flexible TB comprises transmitting the portion of the flexible TB with a Hybrid automatic repeat request (HARQ) process identifier (ID) and a new data indicator (NDI).

20. The method of claim 19, further comprising retransmitting subsets of the CBGs of the flexible TB that have been NACKed with the HARQ process ID and the NDI, with the NDI set to a value indicating this is not a new transmission.

21. The method of claim 15, wherein transmitting the portion of the flexible TB comprises transmitting the flexible TB in one or more of aggregated slots, following a predefined sequence of revision version identifiers (RVIDs), wherein the one or more of aggregated slots is indicated in the signaling message or pre-configured.

22. The method of claim 15, wherein transmitting the portion of the flexible TB comprises transmitting data in an extended slot that is longer than a slot and wherein the signaling message indicates a beginning symbol and an ending symbol of the extended slot that extends over one or more slots.

23. An apparatus for wireless communication, comprising:
a transceiver;
a memory; and
at least one processor coupled to the memory and configured to:
receive a signaling message from a communication device, the signaling message configuring a flexible transport block (TB), and the signaling message comprising a code block group (CBG) transmission index (CBGTI) indicating which subset of a plurality of CBGs included in the flexible TB, is included in the flexible TB for a new transmission or a retransmission; and
receive a first portion of the flexible TB from the communication device, based on the received signaling message;
wherein one or more CBGs of the flexible TB indicated in the CBGTI are empty, when a second communication device has a limited amount of data to transmit in the flexible TB.

24. The apparatus of claim 23, wherein the first portion of the flexible TB comprises a subset of CBGs and the signaling message comprises a CBG transmission index (CBGTI) indicating which subset of the CBGs is included in the flexible TB for a new transmission or a retransmission.

25. The apparatus of claim 23, wherein the at least one processor is further configured to perform at least one of:
receiving a second portion of the flexible TB; and
recovering the entire flexible TB by concatenating at least one of the first portion and the second portion of the flexible TB from multiple slots.

26. The apparatus of claim 23, wherein the at least one processor is further configured to
determine and transmit to the communication device an Acknowledgement/Negative Acknowledgement (ACK/NACK) bitmap, one bit per received CBG.

27. An apparatus for wireless communication, comprising
a transceiver;
a memory; and
at least one processor coupled to the memory and configured to:
transmit a signaling message to a communication device configuring a flexible transport block (TB) for a current transmission opportunity, the signaling message comprising a code block group (CBG) transmission index (CBGTI) indicating which subset of a plurality of CBGs included in the flexible TB, is included in the flexible TB for a new transmission or a retransmission; and
transmit a portion of the flexible TB to the communication device,
wherein one or more CBGs of the flexible TB indicated in the CBGTI are empty, when a second communication device has a limited amount of data to transmit in the flexible TB.

28. The apparatus of claim 27, wherein the at least one processor is further configured to
receive an Acknowledgement/Negative Acknowledgement (ACK/NACK) bit map, one bit for each of the CBGs.

29. The apparatus of claim 27, wherein the at least one processor is further configured to transmit the portion of the flexible TB by transmitting the portion of the flexible TB without waiting for an ACK/NACK until transmissions of all of the CBGs of the flexible TB are finished and/or wherein the at least one processor is further configured to transmit the portion of the flexible TB by transmitting the portion of the flexible TB with a Hybrid automatic repeat request (HARQ) process identifier (ID) and a new data indicator (NDI).

* * * * *